A. WEISSENBORN.
Tuck Marker for Sewing Machines.
No. 3,491. Reissued June 8, 1869.
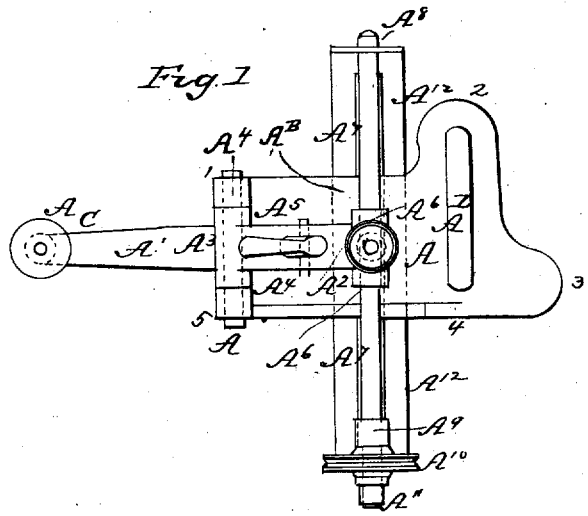
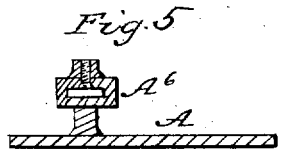
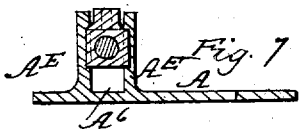
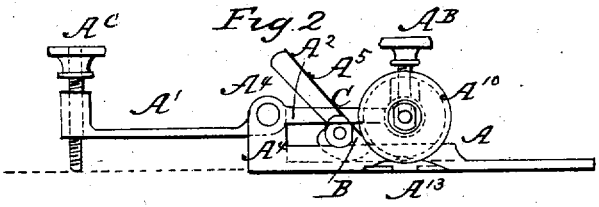
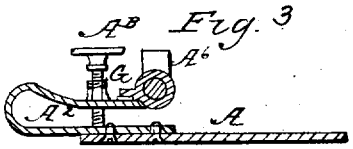
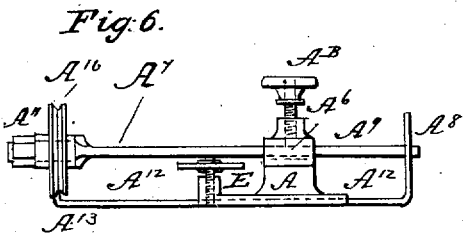
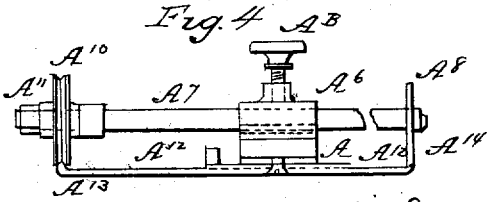
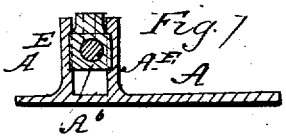
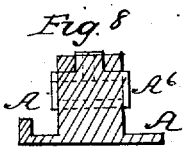
WITNESSES
J. Weissenborn
F. Weissenborn
N. PETERS, Photo-Lithographer, Washington, D. C.

United States Patent Office.

ANNA WEISSENBORN, OF NEW YORK, N. Y.

*Letters Patent No.* 65,141, *dated May* 28, 1867; *reissue No.* 3,491, *dated June* 8, 1869.

IMPROVEMENT IN TUCK-CREASING ATTACHMENT FOR SEWING-MACHINES.

The Schedule referred to in these Letters Patent and making part of the same.

*To all whom it may concern:*

Be it known that I, ANNA WEISSENBORN, of the city, county, and State of New York, have invented a new and useful Improvement in Tuck-Markers or Creasers; and I do hereby declare that the following is a full and exact description thereof, reference being had to the annexed drawings, making a part of this specification, in which—

Figure 1 represents a top view of my invention.

Figure 2, a side view of the same.

Figures 3 and 4 show a modification of my invention.

Figures 5 and 6 represent a simpler application of my invention, using the spindle of the marking-wheel as a spring.

Figures 7 and 8 show a different form for a bearing of the marking-wheel.

Similar letters of reference indicate corresponding parts in all the figures.

The object of my invention is to construct a tuck-creasing device, which may be attached to a sewing-machine, and enable the operator to crease the cloth, during the process of sewing, for different sizes of hem, or tuck; and to this end, It consists in a sliding blade, having an upturned edge, that is secured to and moves with a bar, carrying a grooved wheel, that presses directly on the upturned edge.

To enable others skilled in the art to construct tuck-creasers according to my invention, I will proceed to describe the same, with reference to the drawings.

A is a metallic gauge-plate, of suitable shape, and provided with a slot, $A^{D}$, through which the screw that secures it to the sewing-machine is passed.

This plate has upright lugs $A^{4}$, that serve as bearings for a pin, on which the lever $A^{2}$ turns.

$A^{6}$ is a guide and bearing, fast to the lever $A^{2}$, and which serves as a bearing for the spindle $A^{7}$, which is held in position by the set-screw $A^{B}$.

The spindle $A^{7}$ is provided at one end with a groove, $A^{8}$, and the spindle in this groove is flattened at its sides, to fit into a slot in the upturned end $A^{14}$ of the sliding blade $A^{12}$. This prevents the spindle from turning, and attaches the spindle and blade, so that they slide in either direction together.

A grooved wheel, $A^{10}$, is attached to the other end of the spindle, by means of the collar $A^{9}$ and nut $A^{11}$, so as to turn freely on said spindle.

The sliding blade $A^{12}$ moves in a groove made in the under side of the fixed gauge-plate A, and has, on its extreme end, an upturned edge, $A^{13}$, on which the wheel $A^{10}$ is pressed down, by means of the spring $A^{1}$, which is attached to the lever $A^{2}$, and may be regulated by the set-screw $A^{C}$.

B is an eccentric, attached to the lever $A^{2}$, for the purpose of raising the wheel $A^{10}$, by means of the handle $A^{5}$, during the process of creasing, without operating the spring $A^{1}$.

Figs. 3 and 4 show a different arrangement of my invention, having the spring directly attached to the spindle-guide $A^{6}$.

Figs. 5 and 6 show still another mode of construction, by dispensing with the spring and constructing the spindle in such a manner as to serve the purpose of the spring.

Figs. 7 and 8 show a different construction of the spindle-guide.

The operation of creasing is accomplished by passing the cloth between the grooved wheel $A^{10}$ and the edge $A^{13}$.

Instead of a grooved wheel, an edged wheel might be substituted, and the end of the sliding blade be turned up into a groove.

What I claim, and wish to secure by Letters Patent, is—

1. The combination, with a stationary gauge-plate A, of the movable blade $A^{12}$, having a creasing-edge, $A^{13}$, and the creasing-wheel $A^{10}$, or their stated equivalents, when the said blade and wheel are connected together and adjustable in relation to the gauge, substantially as described.

2. In combination with the above, a spring, substantially as described, for pressing the wheel against the edge.

3. In combination with the elements of the first clause, the wheel-elevating devices $A^{5}$ B.

4. The combination, with a stationary gauge-plate and with creasing-mechanism, substantially such as described, connected together and adjustable thereon, of a set-screw, for confining the said creasing-devices in proper position with the gauge.

ANNA WEISSENBORN.

Witnesses:

EDW. WEISSENBORN,
FANY WEISSENBORN.